United States Patent [19]
Smith et al.

[11] 3,955,417
[45] May 11, 1976

[54] GREASE THERMOPARTICULATING COATING

[75] Inventors: James D. B. Smith, Turtle Creek; David C. Phillips, Pittsburgh; Kenneth W. Grossett, Murrysville, all of Pa.

[73] Assignee: Westinghouse Electric Corporation, Pittsburgh, Pa.

[22] Filed: Apr. 15, 1975

[21] Appl. No.: 568,223

[52] U.S. Cl. .......................... 73/339 R; 73/432 R
[51] Int. Cl.² .................................. G01K 13/02
[58] Field of Search ............. 73/339 R, 349; 252/52 A; 310/52, 55, 56

[56] References Cited
UNITED STATES PATENTS 3,427,880   2/1969   Grobel et al. ............... 73/339 R
3,807,218   4/1974   Carson et al. ............... 73/421.5 R Primary Examiner—Richard C. Queisser
Assistant Examiner—John S. Appleman
Attorney, Agent, or Firm—R. D. Fuerle

[57] ABSTRACT

A grease of a telomer of polytetrafluoroethylene and a perfluoroalkyl polyether is used to protect electrical apparatus from overheating. The grease is applied to a portion of an electrical apparatus which is exposed to a gas stream, particularly to portions subjected to operating temperatures of about 100° to about 130°C. When the coated portion of the electrical apparatus overheats the grease forms particles in the gas stream which are detected by a monitor. The apparatus can then be shut down or its load reduced.

19 Claims, No Drawings

GREASE THERMOPARTICULATING COATING

CROSS-REFERENCE TO RELATED APPLICATIONS

This application is related to application Ser. No. 426,391 filed Dec. 19, 1973 By Emil M. Fort, Thomas D. Karzmarek, and David Colin Phillips titled "Sampling System for Power Generators."

This application is also related to application Ser. No. 568,221 filed of even date, by J. D. B. Smith and D. C. Phillips titled "Metal Acetyl Acetonate Composition For Forming Thermo-Particulating Coating."

This application is related to application Ser. No. 390,284 filed of even date by J. D. B. Smith and D. C. Phillips titled "Malonic Acid Composition for Forming Thermo-Particulating Coating."

This application is related to application Ser. No. 568,224 filed of even date by J. D. B. Smith and D. C. Phillips titled "Diazonium Salt Composition for Forming Thermo-Particulating Coating."

This application is related to application Ser. No. 568,222 filed of even date by J. D. B. Smith and D. C. Phillips, titled "Blocked Isocyanate Composition for Forming Thermo-Particulating Coating."

This application is related to application Ser. No. 568,218 filed of even date by D. C. Phillips, W. M. Hickam, and J. D. B. Smith titled "Multiple Signal Thermo-Particulating Coating."

PRIOR ART

Advertising literature from E. I. DuPont de Nemours & Company (Inc.) describes "Krytox" greases as mixtures of telomers of polytetrafluoroethylene and perfluoroalkyl polyethers. The thermoparticulating properties of the greases are not disclosed.

BACKGROUND OF THE INVENTION

Electrical apparatus, such as motors and turbine generators, occasionally overheat due to shorts or other malfunctions. The longer the overheating continues the more damage is done to the apparatus. A malfunction detected immediately may mean only a quick repair but if the overheating continues, the entire machine may be damaged.

Large rotating electrical apparatus is usually cooled with a hydrogen gas stream. The organic compounds in the apparatus are first to be affected by the overheating and they decompose to form particles which enter the gas stream. Monitors then detect particles in the gas stream and sound a warning or shutdown the apparatus when too many particles are detected.

Descriptions of such monitors and how they function may be found in U.S. Pat. No. 3,427,880 titled "Overheating Detector For Gas Cooled Electrical Machine" and in U.S. Pat. No. 3,573,460 titled "Ion Chamber for Submicron Particles." Another monitor, "The Condensation Nuclei Detector," is described by F. W. Van-Luik, Jr. and R. E. Rippere in an article titled "Condensation Nuclei, A New Technique for Gas Analysis," in Analytic Chemistry 34, 1617(1962) and by G. F. Skala in an article titled "A New Instrument for the Continuous Detector of Condensation Nuclei," in Analytical Chemistry 35, 702 (1963).

The above cross-referenced applications describe many compounds which can be applied in coatings to portions of the generator exposed to the gas stream. (Also see U.S. Pat. Nos. 3,427,880 and 3,807,218). These compounds decompose to form detectable particles (i.e., thermoparticulate, at lower temperatures than do the usual organic compounds found in the apparatus. The use of the compounds is limited to areas of the generator which are normally operated below 80° or even 60°C because they are not stable at higher temperatures.

There are several areas of the generator, however, which normally operate at temperatures of about 100° to about 130°C. Until now no compounds have been found which can withstand continuous temperatures of 100° to 130°C over a long period and then thermoparticulate when the temperature increases to about 180° to about 200°C.

SUMMARY OF THE INVENTION

We have found that a certain type of grease can withstand continuous temperatures of 100° to 130°C and will then thermoparticulate at about 180° to 130°C and will then thermoparticulate at about 180° to about 200°C. Moreover, this grease possesses the usual and very useful property of being able to thermoparticulate repeatedly. Most thermoparticulating compounds can thermoparticulate only once. The grease of this invention, however, will thermoparticulate, cool, and thermoparticulate again when the temperature increases again. This is a very useful property because should a sudden increase in temperature occur, which causes thermoparticulation but does not damage the machine enough to require a shutdown, the machine can continue to be operated with the protection offered by the coating. If another type of coating had been used, it would be necessary to shutdown the machine and apply additional coating or to run the machine without the coating.

While the grease does not discolor after thermoparticulating as the other coatings do, locating the area of overheating is not considered to be a problem because the grease is applied to relatively few areas of the generator. the decomposition products can be readily identified by mass spectroscopy, nuclear magnetic resonance, or gas liquid chromotography.

DESCRIPTION OF THE INVENTION

The greases of this invention are a mixture of a telomer of polytetrafluoroethylene and a perfluoroalkyl polyether. The greases must decompose between about 60° and about 200°C and produce particles larger than about 25A in order for the particles to be detected with presently-existing monitors. A suitable grease comprises about 10 to about 50% (by weight based on the total grease weight) of the telomer and about 50 to about 90% of the polyether. The preferred grease is about 20 to about 30% of the telomer and about 70 to about 80% of the polyether.

A suitable telomer of polytetrafluoroethylene has the general formula $CF_3\text{-}(CX_2\text{-})_mCF_3$ where each X in the formula as extended is independently selected from F and $CF_3$. The X group is preferably F as these compounds are easier to prepare. In the formula m is the number of repeating units. The molecular weight of that telomer is about 10,000 to about 50,000 and preferably is about 15,000 to about 30,000 because at less than 15,000 the viscosity and the thixotropy are low and at more than 30,000 the telomer is difficult to disperse in the polyether.

A suitable perfluoroalkyl polyether has the general formula $CF_3 \text{---} (CX_2 \text{---}_n O \text{---}_p CF_3$ where each X in the formula as extended is independently selected from F and $CF_3$. The X group is preferably F because these compounds are easier to prepare. In the formula, $n$ and $p$ are the number of repeating units and $n$ is preferably 2 or 3 as these compounds are more readily available. The molecular weight of that polyether is about 1000 to about 50,000 and is preferably about 2000 to about 7000 because at less than 2000 the volatility is high and the aging properties are low and at more than 7000 it is too viscous and may be a solid or wax. Mixtures of greases are also contemplated.

The greases are commercially available from the E.I. DuPont DeNemours Company in a variety of viscosities under the trademark Krytox. Viscosities of about 250,000 to about 5,000,000 cps may be suitable but about 500,000 to about 1,500,000 cps is the most practical range as in this range the grease is not so thin that it tends to run at high temperatures nor so thick that it is difficult to apply.

The grease is applied to portions of the electrical apparatus which are exposed to the gas stream. The grease is usually applied on top of conductor although it does not function as insulation and may be applied to insulators. This application may be by various techniques, but simply smearing the grease with a rag is adequate. Thicknesses of about ½ to about 10 mils and preferably about 2 to about 5 mils are suitable.

While the grease is most advantageously applied to those areas which are subjected to a continuous operating temperature of about 100° to about 130°C, they may also be applied to other areas, either alone or in combination with other thermoparticulating compounds in coatings such as those described in the above cross-referenced applications. Three areas of a generator which normally operate at temperatures of about 100° to about 130°C are the inner surfaces of gas-cooled parallel rings and bushings, the stator core, and the rotor hollow conductors.

After thermoparticulation and the resulting alarm has occurred, a sample of the gas stream can be collected and analyzed. Since different thermoparticulating compounds can be used in different areas of the apparatus and their thermoparticulation products are different, analysis of the sample can pinpoint the location of the overheating.

The following examples further illustrate this invention:

EXAMPLE I

Samples were prepared by smearing various greases onto 3 inch by 1 inch aluminum sheets to a thickness of about 2 to 5 mils. The samples were placed in an oven at 120°C for various periods to determine if they were stable and would function after aging.

The samples were placed one at a time in a stainless steel boat within a 1 inch stainless steel tube. Hydrogen was passed over the samples at a flow rate of 7 l/min. A phase-controlled temperature regulator and programmer controlled the temperature in the boat. The temperature in the boat was measured by mounting a hot junction chromel-alumel thermocouple within a small hole in the boat. The output of the thermocouple and the detector were monitored on a two-pen potentiostatic recorder. A 5°C/min. heating rate was maintained in each experiment after the insertion of the sample in the boat. The threshold temperature at which considerable particulation occurred was taken from the chart produced by the recorder. The "alarm" temperature at which considerable particulation occurred corresponded to a 50% decrease in the initial ion current of the detector (usually 0.8 to 0.4 mA). The occurrence of particulation was detected using a Generator Condition Monitor or a Condensation Nuclei Monitor. Both instruments are sold by Environment One Corporation.

The following table gives the thermoparticulating temperatures:

| Grease | AGING TIME AT 120°C (days) | | | |
|---|---|---|---|---|
| | 3 | 10 | 59 | 84 |
| A mixture of about 20% (by weight) telomer of polytetrafluoroethylene and about 80% perfluoroalkyl polyether, sold by DuPont under the trademark "Krytox 240-AD" | 194–198°C | — | 191–198°C | 200–207°C |
| A polyurea-thickened hydrocarbon oil sold by Chevron Oil Co. under the trademark "Chevron BRB2" | 181–184°C | 187–191°C | — | 185–188°C |
| A grease made of colloidal copper, molybdenum, sulfide, and a hydrocarbon oil sold by Fel-Pro Company under the trademark "Fel-Pro C-100" | 174–178°C | 177–184°C | — | 133–135°C* |

*Probably not a true thermoparticulation effect since the sample was in a "flaky" state and large particles were thrown off from the aluminum surface on heating.

Although both the "Chevron BRB2" and the "Fel-Pro C-100" greases thermoparticulated, they both dried up and became flaky after aging. Flakes cannot be tolerated because they could block gas vents. Weight loss tests showed that after 20 weeks of aging at 120°C the "Fel-Pro C-100" grease lost about 40% of its weight and the "Chevron BRB2" grease lost about 28% of its weight, but there was no detectible weight loss for the "Krytox 240-AD" grease.

EXAMPLE II

Krytox 240-AD grease was smeared onto copper rectangular blocks (4 × 2 ¼ × 1 ½ inches) to a thickness of about 2 to 5 mils over an area of 31 square inches (end plates not covered).

The block contained two 650 watt heaters drilled into the copper core; the heaters were connected in parallel (two exit leads). The copper block was also equipped with two thermocouples. The block was connected to separate inspection plates in a 2-pole, 18 KV (690 MVA) generator measuring 104 inches in diameter and 245 inches long, (four sides of block in hydrogen flow), the block being approximately ½ inch from the outer surface of the generator.

In the test, the coated block was externally heated by a source of electrical power. The rate of rise of temperature was controlled to 5°C/minute and the hydrogen was monitored for particulate matter by means of an Environment One Generator Condition Monitor.

The following table gives the results:

| "Alarm" Temperature (°C) | Time of Run (min.) | Pressure (psi) | Speed (rpm) | Gas Temperature (°C) | Monitor Flow (meter reading) |
|---|---|---|---|---|---|
| 190–205 | 35 | 60 | 3600 | 46 | 14.0 |

EXAMPLE III

Example I was repeated using Krytox 240-AD grease, raising and lowering its temperature repeatedly. The heating rate was about 7°C/min. A General Condition Monitor was used to detect the particles. The following table gives the results:

| Temperature Range of Cycle (°C) | Time of Cycle (min) | Temperature Range of Alarm (°C) |
|---|---|---|
| 25–192 | 25 | 187–190 |
| 192–120 | 10 | Signal Lost |
| 120–195 | 15 | 191–194 |
| 195–165 | 5 | Signal Lost |
| 165–200 | 5 | 191–195 |
| 200–130 | 10 | Signal Lost |
| 130–200 | 10 | 193–196 |

We claim as our invention:

1. A method of protecting electrical apparatus from damage due to overheating, said apparatus including a gas stream and a monitor for detecting particles in said gas stream and for emitting a signal when said particles are detected, comprising applying to said electrical apparatus at positions exposed to said gas stream a grease which comprises a telomer of polytetrafluoroethylene and a perfluoroalkyl polyether, and monitoring said gas stream for the presence of particles therein.

2. A method according to claim 1 wherein said telomer of polytetrafluoroethylene has the general formula $CF_3\text{-}(CX_2)_m\text{-}CF_3$ where each X in the formula as extended is independently selected from F and $CF_3$, $m$ is the number of repeating units, and the molecular weight of said telomer is about 10,000 to about 50,000.

3. A method according to claim 1 wherein the molecular weight of said telomer is about 15,000 to about 30,000.

4. A method according to claim 1 wherein said perfluoroalkyl polyether has the general formula $CF_3\text{-}(\text{-}(CX_2)_n\text{-}O\text{-})_p CF_3$ where each X in the formula as extended is independently selected from F and $CF_3$, $n$ and $p$ are the number of repeating units and molecular weight of said polyether is about 1000 to about 50,000.

5. A method according to claim 4 wherein the molecular weight of said polyether is about 2000 to about 7000 and $n$ is an integer from 2 to 3.

6. A method according to claim 1 wherein said grease comprises about 10 to about 50% telomer of polytetrafluoroethylene and about 50 to about 90% perfluoroalkyl polyether.

7. A method according to claim 6 wherein said grease comprises about 20 to about 30% telomer of polytetrafluoroethylene and about 70 to about 80% perfluoroalkyl polyether.

8. A method according to claim 1 wherein said grease is applied to a position which is normally at an operating temperature of about 100° to about 130°C.

9. A method according to claim 8 wherein said apparatus is a generator and said position is the inner surfaces of gas-cooled parallel rings or bushings, the stator core, or the rotor hollow conductors.

10. A method according to claim 1 including the last steps of collecting said particles and analyzing them when said monitor emits a signal.

11. A thermal detection system for electrical apparatus cooled by a gas stream, comprising a coating on a portion of said electrical apparatus exposed to said gas stream and a monitor for detecting the presence of particles in said gas stream, said coating comprising a grease which comprises a telomer of polytetrafluoroethylene and a perfluoroalkyl polyether.

12. A thermal detection system according to claim 11 wherein said telomer of polytetrafluoroethylene has the general formula $CF_3\text{-}(CX_2)_m\text{-}CF_3$ where each X in the formula as extended is independently selected from F and $CF_3$, $m$ is the number of repeating units, and the molecular weight of said telomer is about 10,000 to about 50,000.

13. A thermal detection system according to claim 11 wherein the molecular weight of said telomer is about 15,000 to about 30,000.

14. A thermal detection system according to claim 11 wherein said perfluoroalkyl polyether has the general formula $CF_3\text{-}(\text{-}(CX_2)_n\text{-}O\text{-})_p CF_3$ where each X in the formula as extended is independently selected from F and $CF_3$, $n$ and $p$ are the number of repeating units and the molecular weight of said polyether is about 1000 to about 50,000.

15. A thermal detection system according to claim 14 wherein the molecular weight of said polyether is about 2000 to about 7000 and $n$ is an integer from 2 to 3.

16. A thermal detection system according to claim 11 wherein said grease comprises about 10 to about 50% telomer of polytetrafluoroethylene and about 50 to about 90% perfluoroalkyl polyether.

17. A thermal detection system according to claim 16 wherein said grease comprises about 20 to about 30% telomer of polytetrafluoroethylene and about 70 to about 80% perfluoroalkyl polyether.

18. A thermal detection system according to claim 11 wherein said grease is applied to a position which is normally at an operating temperature of about 100° to about 130°C.

19. A thermal detection system according to claim 18 wherein said apparatus is a generator and said position is the inner surfaces of gas-cooled parallel rings or bushings, the stator core, or the rotor hollow conductors.

* * * * *